Jan. 1, 1929.                P. GRESSER                1,697,314
                         LUBRICANT CONNECTION
                          Filed July 28, 1927
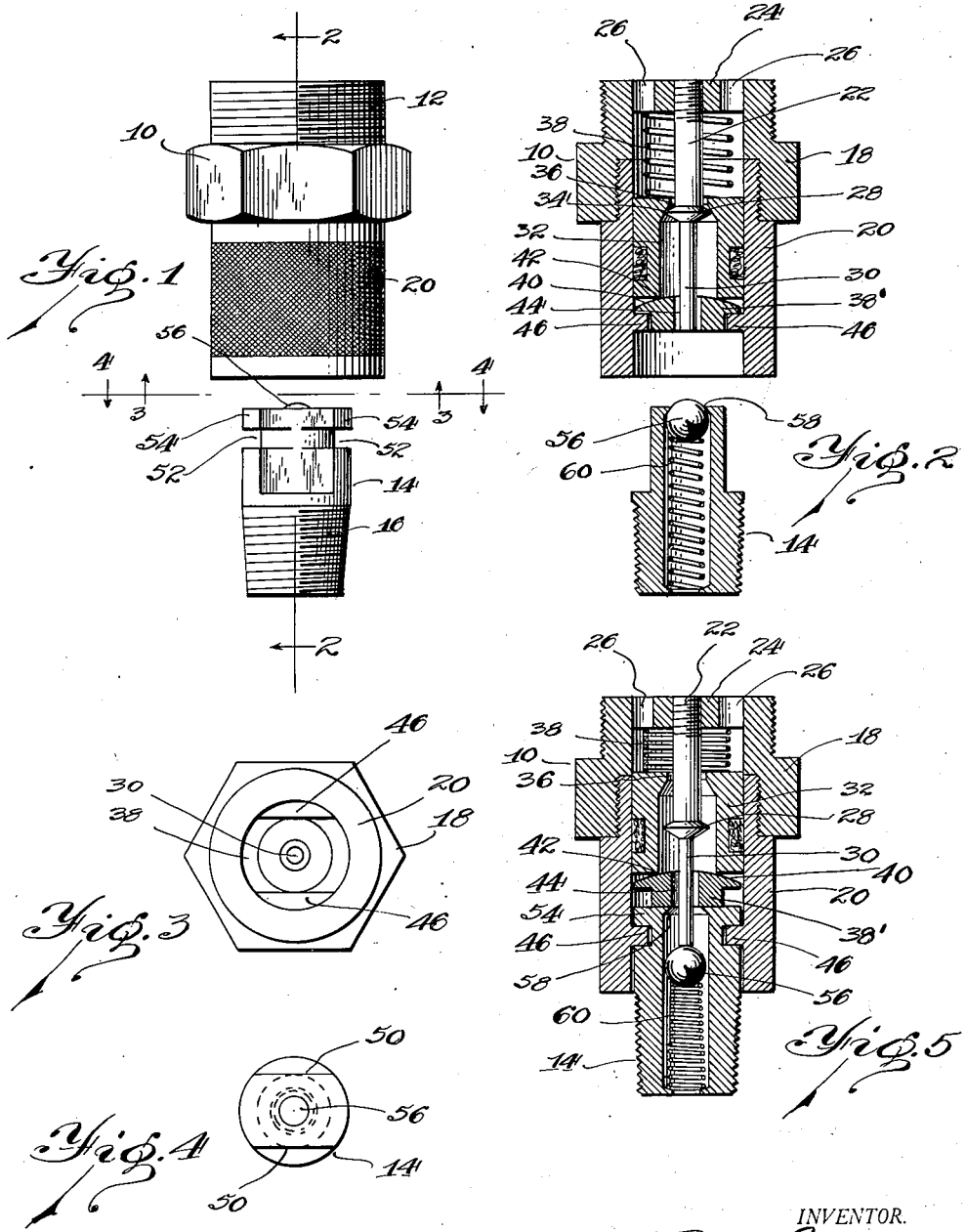
INVENTOR.
Peter Gresser
BY
Parker & Burton
ATTORNEYS Patented Jan. 1, 1929.

1,697,314

UNITED STATES PATENT OFFICE.

PETER GRESSER, OF DETROIT, MICHIGAN.

LUBRICANT CONNECTION.

Application filed July 28, 1927. Serial No. 208,938.

My invention relates to an improved lubricant connection particularly adaptable for a high-pressure lubricating system.

The improved connection comprises a valve controlled inlet member leading to a part to be lubricated and a cooperating valve controlled outlet adapted to be quickly, releasably coupled with the inlet member and which outlet forms a portion of the lubricant discharging apparatus. My invention resides in improvements in the cooperating parts which are coupled together for the passage of lubricant from the pressure developing apparatus to the part to receive lubricant and in the several structural characteristics hereinafter more fully described which make for a coupling that is sturdy in construction, inexpensive as to cost, unusually tight in the joint formed between the dispensing and the receiving portions and which is so constructed that a tight joint is maintained notwithstanding relative angular changes of the discharging apparatus with respect to the receiving member. Reference is made to my Patent No. 1,575,755, granted Mar. 9, 1926 and the present structure represents an improvement over the structure therein described.

The several meritorious features and advantages of this improvement will more fully appear from the following description, appended claims and accompanying drawing, wherein:

Fig. 1 is a side elevation of the parts comprising my invention, detached one from the other.

Fig. 2 is a cross sectional view taken on line 2—2 of Fig. 1.

Fig. 3 is a plan view taken on line 3—3 of Fig. 1.

Fig. 4 is a plan view taken on line 4—4 of Fig. 1.

Fig. 5 is a cross sectional view taken on the same line as Fig. 2 showing the parts coupled together.

One of the parts illustrated is adapted to form the outlet nozzle of a pressure developing apparatus such as a grease gun and the other part is adapted to constitute the inlet of a lubricant receptacle which leads to a part to be lubricated. In the drawing, the part indicated in Fig. 1 as 10 is screw threaded at 12 to be secured to the outlet of a grease gun to constitute the discharge nozzle thereof and the part indicated in the same figure as 14 is screw threaded at 16 to be fastened within a lubricant inlet to constitute the valve controlled inlet therefor.

The part indicated as 10 is here shown as comprising annular screw threaded portions 18 and 20 and constitutes the female member of the coupling. The part 20 is threaded into the part 18 as shown, providing a chambered female member having a stud 22 arranged axially therein and carried by an end portion 24 provided with a series of perforations 26, two of which are shown in Figs. 2 and 5. The stud 22 is provided with a valve seat 28 and a reduced outer end portion 30. Mounted within the chambered portion of the female member is a valve cup 32 adapted to seat as at 34 upon the valve seat 28 of the stud. This valve cup is arranged slidably upon the stud but is oversize the stud as appears at 36 and is held outwardly by a spring 38 to its seat upon the stud.

A valve gasket 38' is arranged within the chamber of the female member 20 for slidable travel over the reduced end 30 of the stud. This gasket has a convex face 40 which seats as at 42 against the outer end of the valve cup 32 and which, due to the fact that the gasket is oversize the end 30 of the stud as appears at 44, forms a close fitting joint with the gasket at different angular positions at which it may rock with respect to the cup and as permitted by the stud. The gasket is held in place by a pair of opposed ledges 46, formed within the female member 20 as will be seen in Fig. 2. When the valve is unseated, as appears in Fig. 5, lubricant passes along the stud through the opening 36 in the valve cup and the opening 44 in the valve gasket for discharge.

The inlet connection 14 is flattened on opposite sides at its outer end as at 50 to be received between the flanges 46 of the female member and undercut on opposite sides as at 52, forming flange portions 54, which are engageable with and rearwardly of flange portions 46 of the female member 20 to releasably couple the male and female members together. The inlet member 14 is provided with a ball valve 56 held outwardly to a seat 58 by a spring 60 which yields inwardly when the parts are coupled together to the stud 30 of the female part engaging such valve during the coupling operation.

When the parts are coupled together, stud 30 engages the valve 56, unseating the same, and the nose of the member 14 engages the gasket 38 of the female part, moving the valve cup 32 thereof rearwardly against the tension of the spring 38 and unseating such valve cup, thereby permitting the flow of lubricant through said parts.

What I claim is:

1. A lubricant connection comprising a chambered female part and a male part receivable therein, one part having a valve controlled inlet and the other part having a valve controlled outlet, an axial stud within the chambered female part, a valve seat on the stud, a valve arranged within said part for slidable travel over the stud and normally seating upon the seat thereof, a gasket arranged within the female part supported upon the stud for slidable travel thereover and abutting the outer face of the valve arranged therein outwardly beyond the valve seat, said parts capable of being quickly, releasably locked together for the discharge of lubricant from one to the other, said stud adapted upon the locking of said parts together to unseat the valve of the male part, said male part provided with a portion adapted to engage the gasket within the female part upon the locking of said parts together to unseat the valve within the female part.

2. A lubricant connection comprising male and female parts adapted to be releasably coupled together, one part having a valve controlled outlet and the other part having a valve controlled inlet, an axial stud within the female part adapted when said parts are coupled together to unseat the valve of the male part, said stud provided with a valve seat remote from its outer end, said female part provided with a valve arranged therein for slidable travel over the stud upon the inner side of the valve seat and adapted to normally seat thereupon, a valve gasket arranged within the female part for slidable travel over the stud upon the opposite side of the valve seat and abutting the outer face of the valve arranged therein, said male part provided with a portion adapted, when said parts are coupled together, to engage the valve gasket to unseat the valve within the female part.

3. In a lubricant connection, a chambered female part having a stud arranged axially therein and provided with a valve seat remote from its outer end, a valve cup arranged therein for slidable travel over the stud, a spring holding the cup normally against the seat on the stud, a valve gasket arranged within the chamber of the female part for slidable travel over the stud, said gasket having a convex face forming close-fitting contact with the open end of the valve cup for rockable movement with respect thereto and as permitted by the stud, a male part adapted to be releasably coupled within the female part and provided with a valve adapted to be unseated by the stud thereof upon the coupling of said parts together, said male part having a portion adapted to engage said gasket forming a close-fitting joint therewith to unseat the valve of the female part upon the coupling of said parts together.

4. A lubricant connection comprising a chambered female part having a stud arranged axially therein and provided with a valve seat spaced from its outer end, a valve cup within the chamber of the female part slidably arranged upon the stud to normally engage the valve seat thereof and adapted to extend outwardly thereover, a valve gasket arranged within the chamber of the female part for slidable travel over the stud, provided with a convex inner face engaging the open end of the cup-shaped valve to form a tight joint therewith at different angular positions with respect thereto, said gasket loosely mounted upon the stud for slidable movement thereover and rockable thereon with respect to the valve cup, a male part receivable within the female part to be detachably coupled therewith provided with a normally closed spring-actuated valve adapted to be unseated by the stud of the female part upon the coupling together of the male and female parts, said male part having a nose portion adapted to engage the gasket of the female part to unseat the valve of said part upon the coupling of said parts together.

5. A lubricant connection comprising male and female parts adapted to be coupled together, each part provided with a valve adapted to be unseated by a portion of the other part upon the coupling of said parts together, the valve of one part comprising an outwardly open valve cup upon the outer end of which is seated the convex face of a valve gasket so mounted as to be capable of rockable movement thereover.

6. A lubricant connection comprising male and female parts adapted to be quickly, releasably locked together, one of said parts provided with a stud adapted to engage a valve carried by the other part to unseat the same upon the locking of said parts together, said stud provided with a valve seat, a cup-shaped valve member arranged within said part slidable over the stud and adapted to normally seat upon the valve seat thereof, and a valve gasket arranged within said part slidable over the stud having a convex face engaging the outer end of the valve member and rockable thereover upon the stud.

In testimony whereof, I, PETER GRESSER, sign this specification.

PETER GRESSER.